United States Patent [19]

Schneider

[11] 4,262,781

[45] Apr. 21, 1981

[54] HYDRAULIC RETARDER FOR MULTI-SPEED POWER TRANSMISSIONS

[75] Inventor: Raymond C. Schneider, Rockford, Ill.

[73] Assignee: Twin Disc, Incorporated, Racine, Wis.

[21] Appl. No.: 58,328

[22] Filed: Jul. 17, 1979

[51] Int. Cl.³ .................................. B60K 41/24
[52] U.S. Cl. .......................... 192/4 B; 192/12 A
[58] Field of Search .................... 192/4 B, 12 A, 12 C, 192/3.57; 188/291; 74/740

[56]         References Cited
U.S. PATENT DOCUMENTS

| | | | |
|---|---|---|---|
| 2,990,919 | 7/1961 | Christenson et al. | 192/4B |
| 3,146,630 | 9/1964 | Ivey | 192/4 B |
| 3,319,491 | 5/1967 | Simpson | 192/3.57 |
| 3,572,177 | 3/1971 | Ishihara | 192/12 C |
| 3,777,860 | 12/1973 | Forster et al. | 192/12 A |
| 3,987,874 | 10/1976 | Fuehrer et al. | 192/4 B |

Primary Examiner—George H. Krizmanich
Attorney, Agent, or Firm—James E. Nilles

[57]         ABSTRACT

A hydraulic retarder in conjunction with a multi-speed power transmission that finds particular utility for off-highway trucks. The hydraulic retarder is continuously filled with oil and is positioned in series with a hydraulically actuated friction type clutch. The retarder remains filled at all times and consequently there is no loss of time in filling or dumping the retarder when it is desired to utilize its retarding action by engaging its clutch.

This "instantaneous" reaction to engagement and disengagement of the retarder makes it possible to use this retarder in certain automatic modes where conventional dump and fill hydrodynamic retardation devices are so slow to react as to be difficult to apply. This retarder has clutched engagement and disengagement. The torque capacity versus speed is varied through cavity pressure control.

3 Claims, 4 Drawing Figures

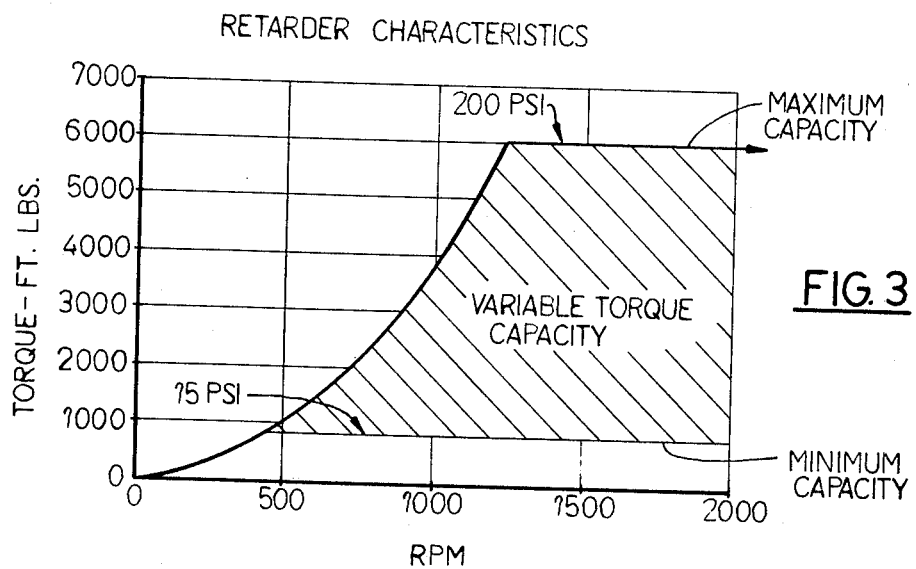

HYDRAULIC RETARDER FOR MULTI-SPEED POWER TRANSMISSIONS

BACKGROUND OF THE INVENTION

Prior art transmissions have utilized a hydraulic retarder but they have been of the type which required the retarder to be emptied when not in use and consequently required filling when they were to be utilized, which resulted in an undesirable delay.

SUMMARY OF THE PRESENT INVENTION

The present invention provides a constantly filled hydraulic coupling retarder for a multi-speed power transmission which instantaneously applies a braking action to the transmission of the vehicle. The invention finds particular utility in large, off-highway trucks. This retarder can be engaged and disengaged manually by the operator and the torque capacity, once engaged, can be controlled by the operator from minimum through maximum. The retarder can also be automatically engaged when the truck over-speeds in any given gear to provide quick retardation of a maximum capacity to bring the vehicle down to normal speeds. More specifically, the invention provides such a hydraulic retarder that is at all time filled with hydraulic fluid to thereby avoid any delay in filling when it is desired to utilize its braking action by engagement of a hydraulically actuated friction plate type clutch that is located in series with the retarder. The hydraulic coupling retarder includes a central rotating member which rotates in fluid such as oil and reacts against opposed vanes located on either axial side of the rotating retarder. The retarder central member includes blades at its radially outer end which generate fluid pressure to cause increased oil flow through a heat exchanger for rapid cooling. The retarder also includes an operator controlled valve by means of which the cavity fluid pressure can be varied to consequently vary the pressure in the retarder and its retarding capacity. Thereby the torque of the retarder is controlled by varying the pressure, say for example, from 15 to 180 p.s.i., which results in a large variable torque capacity.

The control system also includes a pressure regulating valve which insures that the clutch may be engaged only at a minimum pressure. Engagement of the clutch at minimum cavity pressure decreases considerably the dynamic torque required by the clutch to synchronize the retarder rotor and hence makes the clutch relatively small in size, and hence drag.

Another check valve is provided in the hydraulic system for the hydraulic retarder and which is located at the discharge side of the retarder, this valve opening to limit the instantaneously generated outlet pressure in the retarder, thereby permitting the use of a relatively small capacity friction clutch and keeping initial retarder torques to a regulated low value.

The arrangement is such that the retarder is disconnected, giving zero capacity during gear shifting of the transmission. The retarder can automatically engage if the vehicle overspeeds to thereby apply a braking action to the vehicle.

These and other objects and advantages of the present invention will appear hereinafter as this disclosure progresses, reference being had to the accompanying drawings.

THE DRAWINGS

FIG. 1a is a schematic, reduced scale, section view along line 1a—1a in FIG. 1;

FIG. 3 is a graph in which the speed of the retarder in R.P.M. is plotted against its torque to illustrate the variable torque capacity available between minimum and maximum retarder torque and between pressure of 15 to 200 p.s.i. in the retarder.

DESCRIPTION OF A PREFERRED EMBODIMENT

Figure 1:
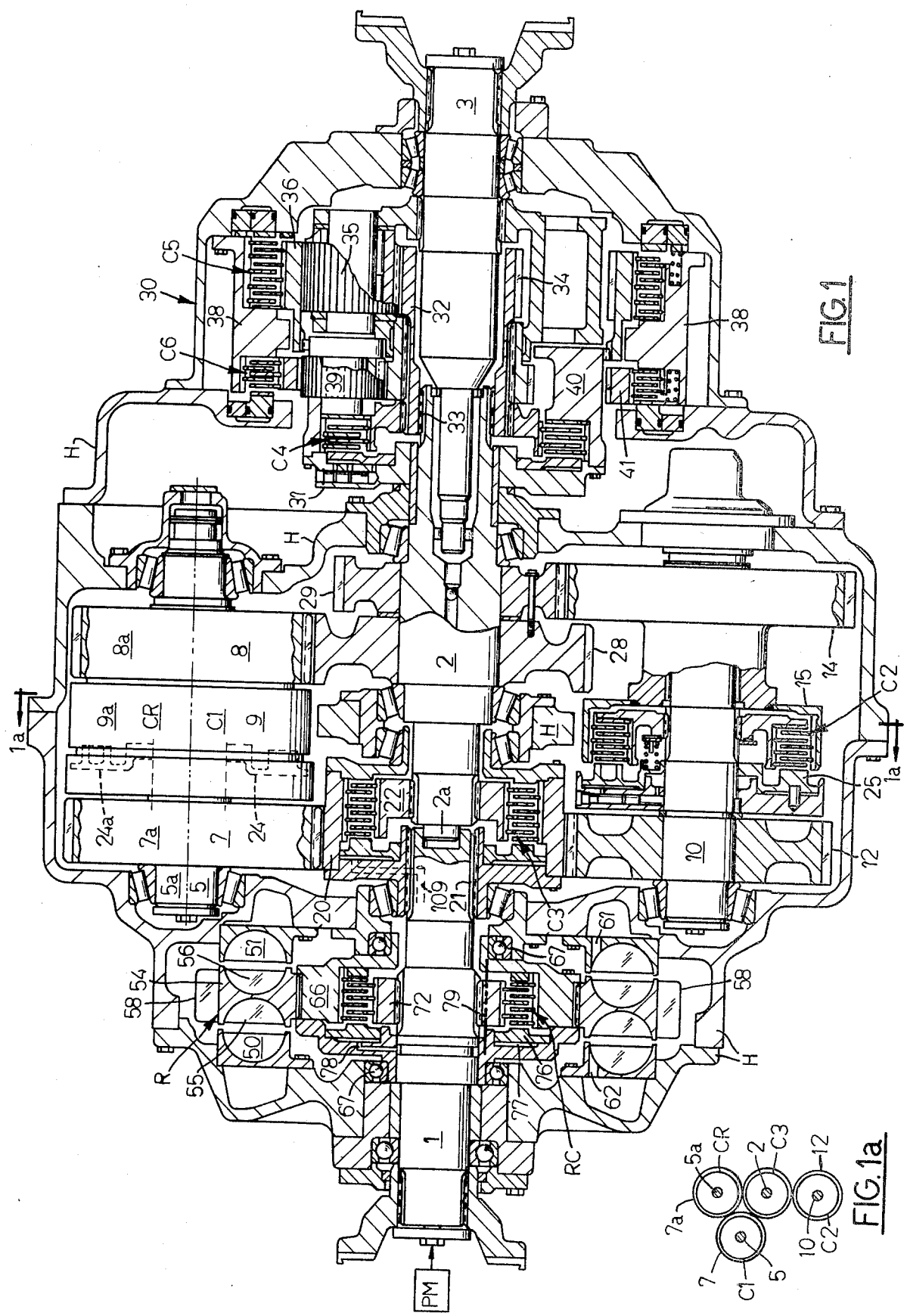
FIG. 1 is a longitudinal, cross sectional view through a transmission embodying the present invention, certain parts removed.

Various multi-speed power transmissions may be utilized with the present invention, but the one shown and described in connection with the invention is a nine speed transmission which finds particular utility in heavy-duty, off-highway trucks. However, it should be noted that the retarder provided by the present invention can be used ahead of any power shift arrangement wherein its clutch connects the rotor to the output shaft through a gear ratio.

The transmission shown utilizes conventional hydraulically actuated friction plate type clutches in combination with various gears to provide different speed ratios in both forward and also in a reverse direction.

The transmission has nine forward ranges, a neutral or start-up range, and one reverse range. For power to be transmitted from the input to the output of the transmission two clutches must be engaged. The first series of clutches consist of three countershaft clutches C1, C2, C3 and the reverse clutch, and the second series of clutches consist of three planetary clutches C4, C5 and C6. The two series of clutches are interconnected by various gear ratios and one clutch from each series must be engaged in order to transmit power from the input to the output.

More specifically, the transmission has a first series of clutches C1, C2 and C3. The transmission shown for illustration purposes specifically includes a power input shaft 1, which is driven by a prime mover PM such as an internal combustion engine, or the torque converter attached to said prime mover, and also includes an intermediate shaft 2 piloted at its forward end 2a in the rear end of the power input shaft 1. A third output shaft 3 is then piloted at its front end in anti-friction bearings in the rear end of the intermediate shaft 2 as clearly shown. A hydraulically actuated friction type clutch C1 is mounted on a shaft 5 suitably journalled in the fixed housing H of the transmission and has gears 7 and 8, respectively, at each side thereof. Gear 7 is fixed on shaft 5. Gear 8 is journalled on shaft 5 and is welded to drum member 9 of clutch C1 in the known manner. A second clutch C2 is provided on another shaft 10 also journalled in the housing and another pair of gears 12 and 14 are located on the shaft 10. Gear 12 is fixed on shaft 10. Gear 14 is journalled on shaft 10 and is welded to the drum member 15 of the clutch C2.

The transmission also includes a central, hydraulically actuated, lock-up friction clutch C3 mounted on and between shafts 1 and 2. When engaged, clutch C3 locks shafts 1 and 2 directly together. When clutch C3 is disengaged, power from shaft 1 is delivered through clutch C1 or clutch C2. Regarding clutch C3, the clutch drum member 20 is splined to shaft 1 at 21 and its gear periphery is in constant mesh with gears 7 and 12. The clutch hub member 22 is splined to shaft 2. Suitable and conventional pistons 24, 24a and 25 are mounted in their respective piston assembly housing or each clutch C1, CR and C2 and pressurization of the actuating chamber formed between the pistons and their housings urge the pistons in an axial direction to cause clamp-up of the intermediate friction plates of their respective clutches, in the known manner. Gear 28 is fixed on shaft 2 and is in constant mesh with the gear 8 and gear 8a. Gear 29 is fixed on shaft 2 and is in constant mesh with gear 14.

Another clutch CR which is shown in the broke-out section behind clutch C1 in FIG. 1 has an input gear 7a that is in constant mesh with gear 7. Gear 7a is fixed to shaft 5a. Gear 8a is journalled on a shaft 5a and is welded to the drive ring 9a of clutch CR. Gear 8a is in constant mesh with gear 28. Since the power train is from the gear periphery of piston carrier 20 to gear 7, to gear 7a, through clutch CR, out gear 8a, to gear 28; shaft 2 rotates in the opposite direction as shaft 1 thus provides reverse.

The various above gears intermesh with one another as shown and act to provide three forward speed ratios and also reverse and deliver them to a second series of clutches in a planetary system 30 located rearwardly in the transmission.

More specifically, a central clutch C4 has its drum 31 fixed to the planetary carrier 40 and its hub is mounted in part on the rear end of shaft 2. A pair of sleeves 32 are splined at 33 to the rear end of shaft 2 and has a sun gear 34 formed thereon at its rear end. A number of planet gears 35 are arranged around the sun gear 34 and mesh with an internal ring gear 36.

Another clutch C5 has its interleaved friction plates splined, respectively, to the large external ring gear 36 and to the stationary housing portion 38.

Another hydraulically actuated friction clutch C6 has its interleaved friction plates splined, respectively, to the housing member 38 and to external ring gear 41 around planet gears 39 that are journalled on the carrier 40.

When combinations of clutches are engaged, various speed ratios are combined. For example, when clutch C1 is engaged, it contributes to reverse and also to 1st, 4th and 7th speeds; clutch C2 provides for 3rd and 6th gear speeds; clutch C3 provides for 2nd, 5th and 8the gear speeds; clutch C4 provides for 7th and 8th gear speeds; clutch C5 provides for reverse, 1st, 2nd and 3rd gear speeds; and clutch C6 provides for 4th, 5th and 6th gear speeds.

In summary, there are two series of clutches, (1) the three countershaft clutches C1, C2 and C3, and (2) the three planetary clutches C4, C5 and C6. One clutch from each series is engaged to transmit power.

HYDRAULIC RETARDER AND ITS CLUTCH

Referring more particularly to the forward end of the transmission, a hydraulic coupling retarder R is provided between the power input shaft 1 and the stationary housing H and acts to brake or retard the rotation of shaft 1 by reacting hydrodynamically, in various degrees, with the housing, thereby retarding the action of the transmission previously referred to.

The retarder R is constantly filled with oil and is operated in the "off" position at a main cavity (outlet) pressure of 10 to 15 p.s.i. The retarder is activated by engaging a wet, immersed hydraulically activated clutch RC located in series with it. When the clutch is engaged, the retarder performs its braking function by bringing the rotor 54 of a double circuit hydraulic coupling into motion. Since the opposite half of each coupling circuit is attached to the ground (housing H), the hydrodynamically generated torque appears as a resistance to shaft rotation.

The hydraulic retarder R includes a pair of opposed, axially spaced apart series of vanes 50 and 51 which are fixed in the housing H. Located between these opposed fixed vanes is the revolving central portion or rotor 54 of the retarder which has outwardly facing vanes 55, 56 that face and each form a hydraulic coupling circuit respectively, with the fixed vanes 50 and 51. A series of blades 58 are located around the outer periphery of the central member 54 and act to add to centrifugally generated retarder rotor pressure. It is this total pressure differential which generates fluid flow to a heat exchanger HE (FIG. 2) via passage 60 and through a check valve CV, and flows back into the retarder via passages 61 and 62. The central rotor 54 of the hydraulic retarder is splined to an outer clutch member 66 which is rotatably journalled on the shaft 1 by anti-friction bearings 67.

The hydraulic coupling retarder R is connectible, as mentioned, to the shaft 1 by means of the hydraulically actuated friction plate type clutch RC which includes a central hub member 72 splined to the shaft 1, and interleaved friction plates are splined, respectively, to the outer member 66 of the clutch and to its inner member 72. A piston 76 is axially slideable in the outer clutch member and defines therewith a pressurizable piston actuating chamber 77. A fluid passage 78 conducts pressure fluid to the chamber to thereby urge the piston into clutch clamp-on position. When the clutch RC is pressurized, its plates are instantaneously clamped up and lock the hydraulic coupling central member 54 to the shaft 1, thereby initiating retarding action.

The clutch RC is capable of being engaged in 1/10 of a second which can bring the vanes of the retarder up to shaft speed and generate pressure for flow. The clutch RC can be activated manually through movement of a cab mounted floor pedal (not shown) which allows the clutch to come on full instantaneously wile holding cavity pressure at a "minimum". If the full torque capability of the retarder is called for through maximum pedal actuation, then the minimum pressure is advanced to a maximum pressure through a timed rate-of-rise device which is pre-set for a given time. A retarder pressure valve BV (FIG.2) of large area is provided in the circuit and is located at the discharge of the retarder and allows cavity pressure of the retarder to go to a reduced value during initial synchronization. During this time, the quick increase in rotor r.p.m. would normally generate a high pressure at the retarder exit and hence high instantaneous torques would be seen in spite of minimum cavity control pressures. Thus, the clutch RC is designed small enough so that the transmission is not penalized by loss of horsepower, the loss being less than one-half of one percent of the truck horsepower. The steady state torque of the retarder can be controlled by varying the cavity pressure from, for example 15 p.s.i. to 200 p.s.i. (see FIG. 3). This control is regulated by movement of an operator stem 87 and its spool 86. This controls the exit retarder pressure at passage 60 through piston 81 in vlave RV.

HYDRAULIC CONTROL CIRCUIT—FIG. 2

The retarder clutch RC receives fluid pressure via line 80 from the retarder control valve RV, which consequently engages the clutch to bring the retarder rotor up to speed. Pressure fluid is delivered from a pressure source, such as a pump 82 via line 83, a main pressure regulator valve 84, and via line 83a to the valve RV. Passage 85 in the vlave RV directs the pressure fluid to a retarder pressure apply spool 86 that is attached to the operator's stem 87. When the stem is depressed, pressure fluid flows past the spool 86 and via line 88 to a retarder valve clutch apply valve 89. Spool 90 moves down to cause the latter to cause pressure fluid to flow to or from the clutch RC of the retarder R. More specifically, the spool 90 of valve 89 is shifted in the appropriate axial direction either manually as described above, or by an electrically engaged solenoid valve 91 which disengages the retarder clutch RC during speed range shifts, or by the solenoid valve 92 which automatically engages the clutch when the transmission over-speeds.

Figure 2:
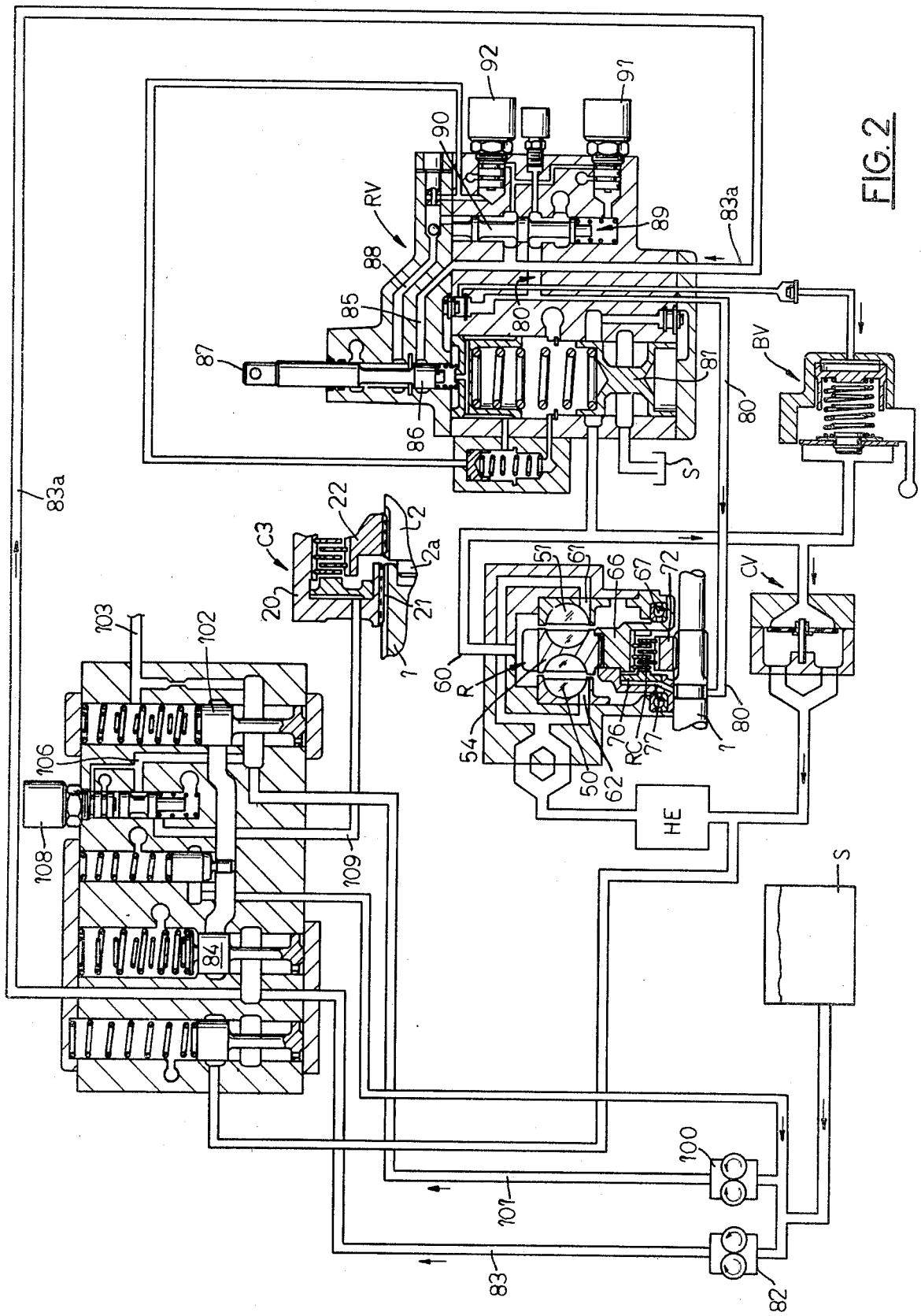
FIG. 2 is a schematic hydraulic diagram utilizing the present invention.

The hydraulic control circuit shown in FIG. 2 also includes a fluid pressure pump 100 for delivering pressure fluid via line 101 to a flow divider valve 102 and a lubrication pressure passage 103. The flow divider valve permits pressure fluid to flow to the spool of the main pressure regulating valve 84. Furthermore, this pressure is directed via passage 106 to the valve spool of the lock-up solenoid 108 for the lock-up clutch actuation. The engine is thereby also utilized as a braking means and adds to the braking effect of the retainer R.

The clutch RC is in series with the retarder R and the latter remains always filled with oil and ready to efect its retarding action. The retarder is automatically actuated if the vehicle engine starts to over-speed, resulting in automatic braking, based on sensing of the engine speed.

The retarder clutch will be automatically disengaged everytime a transmission change is called for. The retarder can be re-engaged after a set time (say 600 milliseconds) after the shift is completed—if the flow pedal is still operator depressed.

I claim:

1. A power transmission for an off-highway truck of the type having a power source and ground wheels driven thereby, said transmission including a fixed housing, power input shaft journalled in said housing and connected to said source and driven thereby, a variable speed gear means connected to said shaft and driven thereby and connected to ground wheels of the vehicle for driving the latter, a hydraulic coupling retarder mounted within said housing and around said shaft and including a set of stationary vanes fixed to said stationary housing and also including a rotor having a set of rotatable vanes for cooperation with said stationary vanes, said coupling retarder being continuously filled with fluid;

a hydraulic circuit including said hydraulic coupling, and a hydraulically actuated friction plate type retarder clutch in said circuit and having a first part fixed to said shaft and driven thereby and having a second part fixed to said rotatable vanes for rotatably driving the latter, and interleaved friction plates between said first and second parts and hydraulically actuated between engaged and disengaged positions and for engagement of said retarder rotor;

and control valve means in said hydraulic circuit and connected to said retarder and for directing pressure fluid thereto with variable pressure to consequently cause modulation of the retarding action of the retarder whereby rotation of said shaft is retarded through said hydraulic retarder by being attached to said shaft when said retarder clutch is engaged.

2. The transmission set forth in claim 1 including a retarder clutch valve in said circuit and in communication with fluid in said hydraulic fluid coupling retarder and for holding a reduced pressure value of fluid in said retarder to result in engagement of said retarder clutch at a predetermined minimum value.

3. The transmission set forth in claim 1 including a second power shaft for transmitting power between said power input shaft and said gear means, hydraulically actuated friction plate type clutches connected to and between said power input shaft and said second shaft for selectively locking said shafts together and hydraulic control means for engaging said clutches to thereby lock said shafts together and provide additional braking action of said power shaft against said power source in each discrete gear of transmission operation.

* * * * *